US008140591B2

(12) United States Patent
Purcell et al.

(10) Patent No.: US 8,140,591 B2
(45) Date of Patent: Mar. 20, 2012

(54) ENABLING WORKFLOW AWARENESS WITHIN A BUSINESS PROCESS MANAGEMENT (BPM) SYSTEM

(75) Inventors: Joshua L. Purcell, Dallas, TX (US); Nelson M. Sanchez, Keller, TX (US); Tassanee K. Supakkul, Euless, TX (US); Mathews Thomas, Flower Mound, TX (US); Julio Wong, Pembroke Pines, FL (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 12/689,536

(22) Filed: Jan. 19, 2010

(65) Prior Publication Data
US 2011/0179058 A1    Jul. 21, 2011

(51) Int. Cl.
*G06F 17/30*    (2006.01)
(52) U.S. Cl. ......... 707/804; 707/758; 707/771; 705/301
(58) Field of Classification Search ......... None
See application file for complete search history.

(56) References Cited

U.S. PATENT DOCUMENTS

| | | | |
|---|---|---|---|
| 6,817,008 B2 | 11/2004 | Ledford et al. | |
| 7,174,338 B2 * | 2/2007 | Leymann et al. | 1/1 |
| 7,610,263 B2 * | 10/2009 | Dettinger et al. | 1/1 |
| 2003/0177046 A1 * | 9/2003 | Socha-Leialoha | 705/7 |
| 2004/0119738 A1 * | 6/2004 | Beringer et al. | 345/738 |
| 2006/0112062 A1 * | 5/2006 | Leymann et al. | 707/1 |
| 2007/0156486 A1 * | 7/2007 | Sanabria et al. | 705/8 |
| 2008/0027782 A1 * | 1/2008 | Freire et al. | 705/9 |
| 2008/0097816 A1 * | 4/2008 | Freire et al. | 705/9 |
| 2008/0313153 A1 * | 12/2008 | Lawrence et al. | 707/3 |
| 2009/0171720 A1 | 7/2009 | Crook et al. | |

OTHER PUBLICATIONS

"Notice from the European Patent Office dated Oct. 1, 2007 concerning business methods", Nov. 2007, Amtsblatt EPA / Official Journal EPO / Journal official OEB, pp. 592-593.
PCT International Search Report, mailed Mar. 4, 2007, re: PCT/EP2011/050068. pp. 1-8.
Ruopeng, L., et al., "On Managing Business Processes Variants", Data & Knowledge Engineering, vol. 68, Issue 7 (Jul. 2009), pp. 642-664, Jul. 2009.

* cited by examiner

*Primary Examiner* — Debbie Le
(74) *Attorney, Agent, or Firm* — Patents on Demand P.A.; Brian K. Buchheit; Scott M. Garrett (57) ABSTRACT

Enabling workflow awareness within a business process management (BPM) system can utilize a workflow awareness controller that can receive an instantiation request for a workflow. The workflow can be comprised of multiple workflow steps to be performed by the BPM system. From workflow metadata, workflow redundancies, at the instance or step level, can be determined with other workflow instances initiated prior to the receipt of the instantiation request. The workflow metadata can include records that uniquely represent the operating parameter values of the prior workflow instances. When a workflow redundancy exists, persistent workflow data corresponding to the workflow redundancy can be utilized during the performance of a workflow instance of the requested workflow within the BPM system. The persistent workflow data can replace the performance of one or more workflow steps of the workflow instance, which can reduce the redundant performance of the workflow steps for the requested workflow.

18 Claims, 3 Drawing Sheets

ENABLING WORKFLOW AWARENESS WITHIN A BUSINESS PROCESS MANAGEMENT (BPM) SYSTEM

BACKGROUND

The present invention relates to the field of business process management (BPM) systems and, more particularly, to automating cross-workflow awareness within a BPM.

Business process management (BPM) systems orchestrate the performance of various tasks between the components of an enterprise computing system. At the heart of this orchestration is the concept of a workflow that defines each step to be performed, the system performing it, and the data values to be used. As each step of the workflow is performed, the BPM system uses the received output to conduct the next step.

Workflows, however, have become increasingly complex and often overlap in functionality. Further, workflows are often written from a specific perspective (i.e., customer, development, etc.) and the author may not be aware of similar workflows for the process that are written from other perspectives. This situation results in multiple workflows that include common steps, which are individually performed by each workflow, and unnecessarily consume system resources with repetitive operations.

For example, at the end of the month, the sales department runs a workflow having a step that totals the monthly sales. The accounting department runs a separate workflow that includes a step that totals the monthly sales. Each workflow, when run, totals the monthly sales separately; the same output is generated twice.

Current BPM systems are inefficient in the sense that they blindly run workflows without regard to results from previous runs that could be reused on the current run.

BRIEF SUMMARY

One aspect of the present invention can include a method for enabling workflow awareness within a business process management (BPM) system. An instantiation request for a workflow can be received by a workflow awareness controller. A workflow can be comprised of multiple workflow steps that are to be performed by the BPM system. From workflow metadata, one or more workflow redundancies can be determined with other workflow instances initiated prior to the receipt of the instantiation request. A workflow redundancy can be categorized as an instance-level redundancy or a step-level redundancy. The workflow metadata can include records that uniquely represent the operating parameter values of the prior workflow instances. When a workflow redundancy exists, persistent workflow data corresponding to the workflow redundancy can be utilized during the performance of a workflow instance of the requested workflow within the BPM system. The persistent workflow data can replace the running of one or more workflow steps of the workflow instance, which can reduce the redundant performance of the workflow steps for the requested workflow.

Another aspect of the present invention can include a business process management (BPM) system that enables workflow awareness. Such a BPM system can include workflows, a BPM engine, a workflow metadata registry, persistent workflow data, and a workflow awareness controller. The workflows can include multiple workflow steps to be performed by the BPM system. The BPM engine can be configured to run the workflows within the BPM system. A workflow instance can be instantiated to run a workflow. The workflow metadata registry can include workflow metadata that uniquely represents the operating parameter values for prior performances of workflow instances. The persistent workflow data can store values for the prior runs of the workflow instances. The values to be stored can be designated within the workflow metadata registry. The workflow awareness controller can be configured to circumvent redundant performances of a workflow instance or a workflow step using the persistent workflow data.

Yet another aspect of the present invention can include a computer program product that includes a computer readable storage medium having embedded computer usable program code. The computer usable program code configured to receive an instantiation request for a workflow. The workflow can be comprised of multiple workflow steps to be performed by a BPM system. The computer usable program code can be configured to determine, from workflow metadata, workflow redundancies with workflow instances initiated prior to the receipt of the instantiation request. A workflow redundancy can be categorized as an instance-level redundancy or a step-level redundancy. The workflow metadata can be comprised of records that uniquely represent operating parameter values for the performance of a prior workflow instance. The computer usable program code can be configured to, when a workflow redundancy exists, utilize the persistent workflow data corresponding to the workflow redundancy during the performance of a workflow instance of the requested workflow within the BPM system. The persistent workflow data can replace the performance of one or more workflow steps of the workflow instance, reducing redundant performance of the workflow steps for the requested workflow.

DETAILED DESCRIPTION

The present invention discloses a solution that enables workflow awareness within a business process management (BPM) system. A workflow awareness controller can automatically and dynamically optimize the performance of workflow instances by reusing previously generated data for steps common to multiple workflow instances. The workflow awareness controller can capture the specific operating conditions about running workflow instances within a workflow metadata registry. The output for each step of a workflow instance can be stored as persistent workflow data to be used as a replacement for repeating the same workflow step in another workflow instance. An expiration time can be set for the persistent workflow data to manage storage space. A workflow optimization interface can be alternately used to define explicit equivalencies between workflow steps.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction handling system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction handling system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

Figure 1:
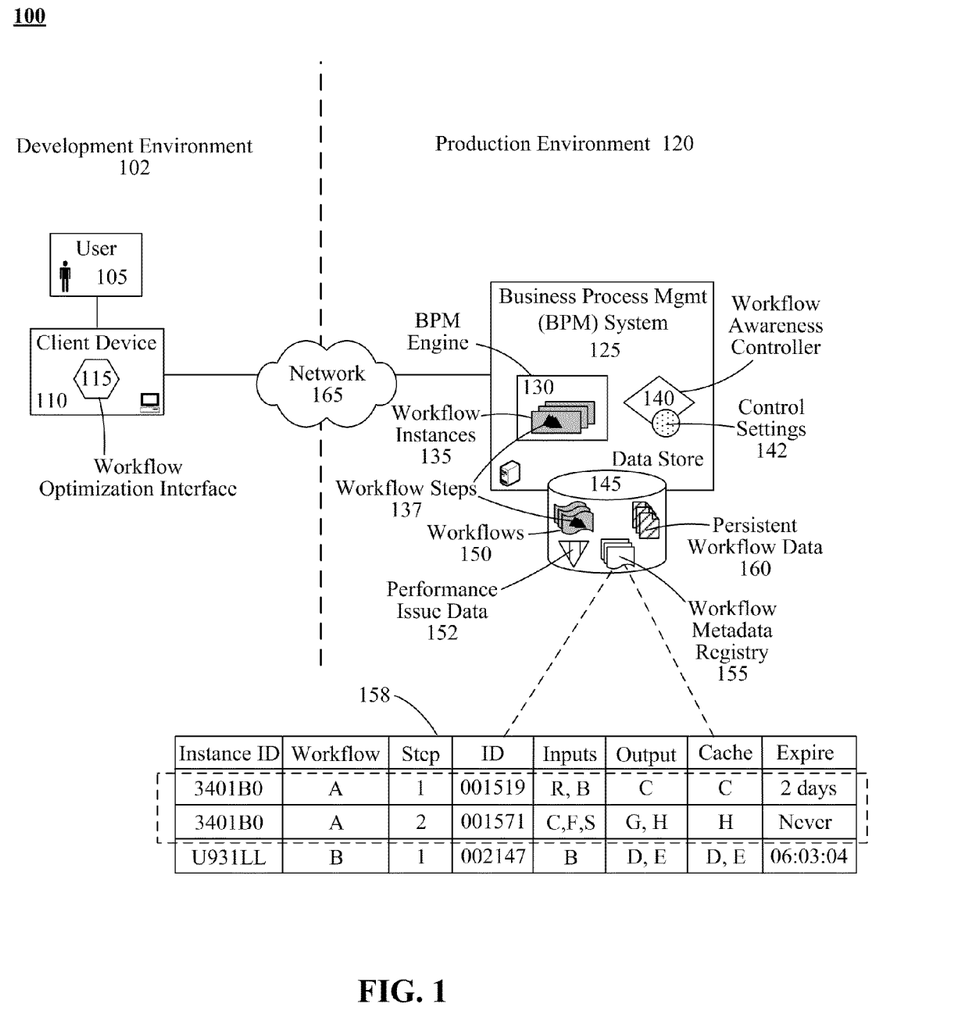
FIG. 1 is a schematic diagram illustrating a system that enables workflow awareness within a business process management (BPM) system in accordance with embodiments of the inventive arrangements disclosed herein.

FIG. 1 is a schematic diagram illustrating a system 100 that enables workflow 150 awareness within a business process management (BPM) system 125 in accordance with embodiments of the inventive arrangements disclosed herein. In system 100, a workflow awareness controller 140 can monitor the operating conditions of multiple workflow instance 135 being run by the BPM system 125 in order to handle repetitive workflow instance 135 and/or common workflow steps 137.

The BPM system 125 can represent the hardware and/or software components required to define and handle performance of workflows 150. The BPM system 125 can operate within a production environment 120. The production environment 120 can encompass the enterprise computing system, network 165 accessible components, and/or architectures (i.e., service-oriented architecture (SOA)) used to perform business functions and transactions. It should be noted that the production environment 120 can also include the other systems (not shown) with which the BPM system 125 interacts.

The BPM system 125 can include a variety of components arranged in numerous configurations (i.e., distributed, grid, etc.) that can be used to perform workflow 150 functions. Components of particular note to this embodiment of the present invention can include a BPM engine 130, a workflow awareness controller 140, and a data store 145 containing the workflows 150, a workflow metadata registry 155 and persistent workflow data 160.

The BPM engine 130 can represent the software element of the BPM system 125 configured to handle the performance of workflow instances 135. For example, the BPM engine 130 can generate and convey message traffic to other software applications and/or systems of the production environment 120 to perform a defined workflow step 137.

A workflow instance 135 can represent a single invocation of a workflow 150. The workflow 150 can be the source definition of the workflow steps 137 within the BPM system 125. Every time the workflow 150 is invoked within the BPM system 125, a new workflow instance 135 can be generated and performed by the BPM engine 130. Thus, the term "workflow" refers to the source and all workflow instances 135, whereas the term "workflow instance" denotes a specific instantiation of the workflow 150.

A workflow step 137 can represent a specific action or activity of the workflow 150. Each workflow instance 135 of the same workflow 150 can perform the same workflow steps 137. However, this does not mean that each workflow instance 135 is equivalent to each other. Workflow instances 135 of the same workflow 150 can be initiated with different input values that result in different outputs. Further, depending upon the BPM system 125, a workflow step 137 can refer to another workflow 150 and/or sub-workflow.

The workflow awareness controller 140 can represent a software element of the BPM system 125 configured to provide awareness or visibility to running workflow instances 135 in order to optimize performance through the reuse of persistent workflow data 160 for identical workflow instances 135 or workflow instances 135 of different workflows 150 having identical steps. Data communications within the BPM system 125 can be modified to allow the workflow awareness controller 140 to preprocess the initiation of workflow instances 135 prior to being run by the BPM engine 130. The workflow awareness controller 140 can be further configured to override performance of a workflow step 137 by the BPM engine 130, instead, providing the BPM engine 130 with output data representing performance of that workflow step 137.

For example, InstanceOne 135 of Workflow X 150 can be running when InstanceTwo 135 of Workflow X 150 is initiated; each workflow instance 130 having the same input values. The workflow awareness controller 140 can identify that that InstanceTwo 135 is identical to the currently running InstanceOne 135. Thus, the workflow awareness controller 140 can determine that performance of InstanceTwo 135 is unnecessary and not pass the request for initiation of InstanceTwo 135 to the BPM engine 130. Upon completion of InstanceOne 135, the workflow awareness controller 140 can send the output to the requestors of both InstanceOne 135 and InstanceTwo 135.

In the case where only one or more workflow steps 137 are common between the workflow instances 135, the workflow awareness controller 140 can communicate to the BPM engine 130 which workflow steps 137 are to be skipped. The workflow awareness controller 140 can provide the BPM engine 130 with persistent workflow data 160 from a previous performance of the common workflow steps 137 in lieu of running the workflow steps 137.

When performing its tasks, the workflow awareness controller 140 can utilize the workflow metadata registry 155, persistent workflow data 160, performance issue data 152, and control settings 142. The control settings 142 can represent a set of user-configurable parameters that impact function of the workflow awareness controller 140. For example, a user 105 can set the expiration periods for elements of the workflow metadata registry 155.

The workflow metadata registry 155 can represent a listing of key data elements about workflow instances 135 that are currently running or have been run recently. The workflow awareness controller 140 can use the data elements collected in the workflow metadata registry 155 when determining commonalities between workflow instances 135.

Table 158 can illustrate an example of the data elements that the workflow awareness controller 140 can collect within the workflow metadata registry 155. The boxed information can exemplify the data for an instance 135 of Workflow A. Reading from left to right, this instance 135 can be distinguished from other workflow instances 135 based upon a unique "Instance ID". Further, the workflow 150, Workflow A, can also be captured. Each workflow step 137 can also be uniquely identified. The inputs and outputs of each step 137 can be collected as well as what data is to be stored in the persistent workflow data 160 and for how long.

Thus, the boxed information can be read as stating that an instance 135 of Workflow A 150 was run having two steps 137. Step 1 used the input values "R and B" and generated an output value of "C", which was stored and will expire 48 hours after completion of step 1. Step 2 used input values of "C, F, and S" and generated output values "G and H" of which only "H" will be stored without expiration.

In another contemplated embodiment, the data captured in the workflow metadata registry 155 can be stored and/or viewed in a hierarchical tree structure. This structure can be particularly beneficial for complex workflows 150 having nested workflows 150.

In yet another embodiment, the expiration of data within the workflow metadata registry 155 can function on a timer basis. That is, a time period can be defined for the metadata, which can be presented as a timer that is continually updated within the workflow metadata registry 155.

It should be noted that the items presented in table 158 are for illustrative purposes only and are not meant as an absolute implementation or limitation of this embodiment of the present invention.

As the workflow instances 135 are run by the BPM engine 130, the workflow awareness controller 140 can capture the outputs of each step 137 as well as any items of performance issue data 152. The performance issue data 152 can represent information regarding any detected problems (i.e., heavy server load) or operation changes (i.e., use of alternate paths) with the running workflow instances 135. The workflow awareness controller 140 can utilize the performance issue data 152 to apprise other workflow instances 135 and/or impacted users 105.

For example, an inventory management system can be experiencing a heavy server load, increasing the response time for queries. InstanceOne 135, currently performing step A 137, can be awaiting a response from the inventory management system. The BPM engine 130 or another specialized component of the BPM system 125 can recognize the slowdown and provide assistance (i.e., alternate pathing) and/or inform other components such as the workflow awareness controller 140. The workflow awareness controller 140 can then determine other running workflow instances 135 that maybe affected and notify those workflow instances 135 of the issue.

The output data of a workflow step 137 captured by the workflow awareness controller 140 can be designated for storage within the corresponding workflow metadata registry 155. Such captured data can be stored as persistent workflow data 160. The persistent workflow data 160 can be utilized at a later time by the workflow awareness controller 140 to circumvent running an identical workflow step 137.

Thus, the workflow awareness controller 140 can provide an automated means for dynamically determining efficiencies between workflow instances 135 performed by the BPM system 125. Alternately, within a development environment 102, a user 105 can utilize the workflow optimization interface 115 to create explicit equivalencies between workflow steps 137 of two workflows 150. Such defined equivalencies can be stored as control settings 142.

The workflow optimization interface 115 can be a software application configured to operate upon a client device 110. The client device 110 can represent a variety of computing devices, such as desktop computers, laptops, or workstations. The workflow optimization interface 115 can provide the ability for the user 105 to push changes made within the development environment 102 into the production environment 120.

Alternately, the workflow optimization interface 115 can be accessed by a user 105 from a computing component of the BPM system 125 within the production environment 120.

Network 165 can include any hardware/software/and firmware necessary to convey data encoded within carrier waves. Data can be contained within analog or digital signals and conveyed though data or voice channels. Network 165 can include local components and data pathways necessary for communications to be exchanged among computing device components and between integrated device components and peripheral devices. Network 165 can also include network equipment, such as routers, data lines, hubs, and intermediary servers which together form a data network, such as the Internet. Network 165 can also include circuit-based communication components and mobile communication components, such as telephony switches, modems, cellular communication towers, and the like. Network 165 can include line based and/or wireless communication pathways.

As used herein, presented data store 145 can be a physical or virtual storage space configured to store digital information. Data store 145 can be physically implemented within any type of hardware including, but not limited to, a magnetic disk, an optical disk, a semiconductor memory, a digitally encoded plastic memory, a holographic memory, or any other recording medium. Data store 145 can be a stand-alone storage unit as well as a storage unit formed from a plurality of physical devices. Additionally, information can be stored within data store 145 in a variety of manners. For example, information can be stored within a database structure or can be stored within one or more files of a file storage system, where each file may or may not be indexed for information searching purposes. Further, data store 145 can utilize one or more encryption mechanisms to protect stored information from unauthorized access.

Figure 2:
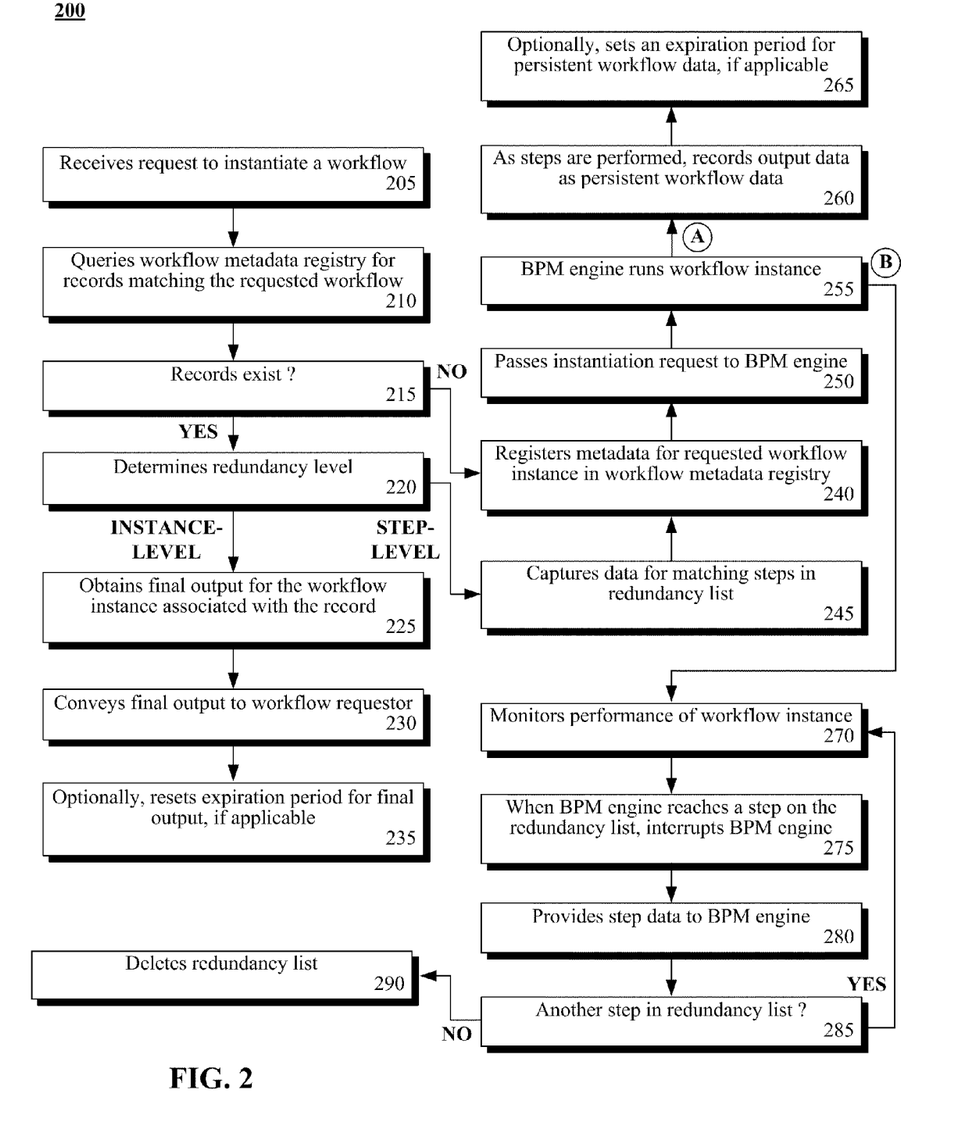
FIG. 2 is a flow chart of a method describing an enablement of workflow awareness provided by a workflow awareness controller in accordance with an embodiment of the inventive arrangements disclosed herein.

FIG. 2 is a flow chart of a method 200 describing an enablement of workflow awareness provided by a workflow awareness controller in accordance with embodiments of the inventive arrangements disclosed herein. Method 200 can be performed within the context of system 100 or another business process management (BPM) system supporting operation of the workflow awareness controller.

Method 200 can begin in step 205 where the workflow awareness controller can receive a request to instantiate an instance of a workflow. The workflow metadata registry can be queried for records matching the requested workflow in step 210. In step 215, it can be determined if records exist within the workflow metadata registry that match the requested workflow.

When records exist, the redundancy level of the requested workflow instance can be determined in step 220. Performance of step 220 can involve the workflow awareness controller comparing the input values of the requested workflow instance with the input values stored in the records of the workflow metadata registry.

When the requested workflow is determined to be an instance-level redundancy, step 225 can be performed where the final output for the workflow instance associated with the record can be obtained. The final output can correspond to the data that is returned to the requestor, not the output of an intermediary step of the workflow. Also, obtainment of the final output can vary depending on the status of the workflow instance associated with the record. If the workflow instance is still running, the workflow awareness controller can wait for its completion. If the workflow instance is already completed, the final output can be retrieved from the persistent workflow data.

In step 230, the final output can be conveyed to the workflow requestor. Optionally, the expiration period for the final output can be reset in step 235, when expiration of persistent workflow data is utilized by the BPM system and/or workflow awareness controller.

When the requested workflow is determined to have one or more step-level redundancies, method 200 can flow from step 220 to step 245 where the workflow awareness controller can capture data for the matching steps in a redundancy list. When no records in the workflow metadata registry match the requested workflow or upon completion of step 245, the workflow awareness controller can register the metadata for the requested workflow instance in the workflow metadata registry in step 240.

In step 250, the workflow awareness controller can pass the instantiation request to the BPM engine. The BPM engine can run the workflow instance in step 255. From step 255, flow of method 200 can diverge into two parallel paths, A and B.

In path A, while the workflow instance is being run by the BPM engine, the workflow awareness controller can record the output data of the workflow steps as persistent workflow data as designated in the workflow metadata. That is, once a step of the workflow instance is completed, the output values indicated in the workflow metadata can be stored.

In step 265, an expiration period for the persistent workflow data can be set, when expiration of persistent workflow data is utilized by the BPM system and/or workflow awareness controller.

While the workflow instance is being run by the BPM engine, the workflow awareness controller can also perform the steps of path B. In path B, the workflow awareness controller can monitor the performance of the workflow instance by the BPM engine in step 270.

In step 275, when the BPM engine reaches a step in the performance of the workflow instance that is on the redundancy list, the workflow awareness controller can interrupt the BPM engine. The step data corresponding to the redundant step can be provided to the BPM engine in step 280. The BPM engine can use the step data in lieu of performing the workflow step.

In step 285, it can be determined if another step exists on the redundancy list. When no other steps exist on the redundancy list, the redundancy list can be deleted in step 290. When another step exists on the redundancy list, flow of method 200 can return to step 270 to continue monitoring performance of the workflow instance until the redundancy list is exhausted.

Figure 3:
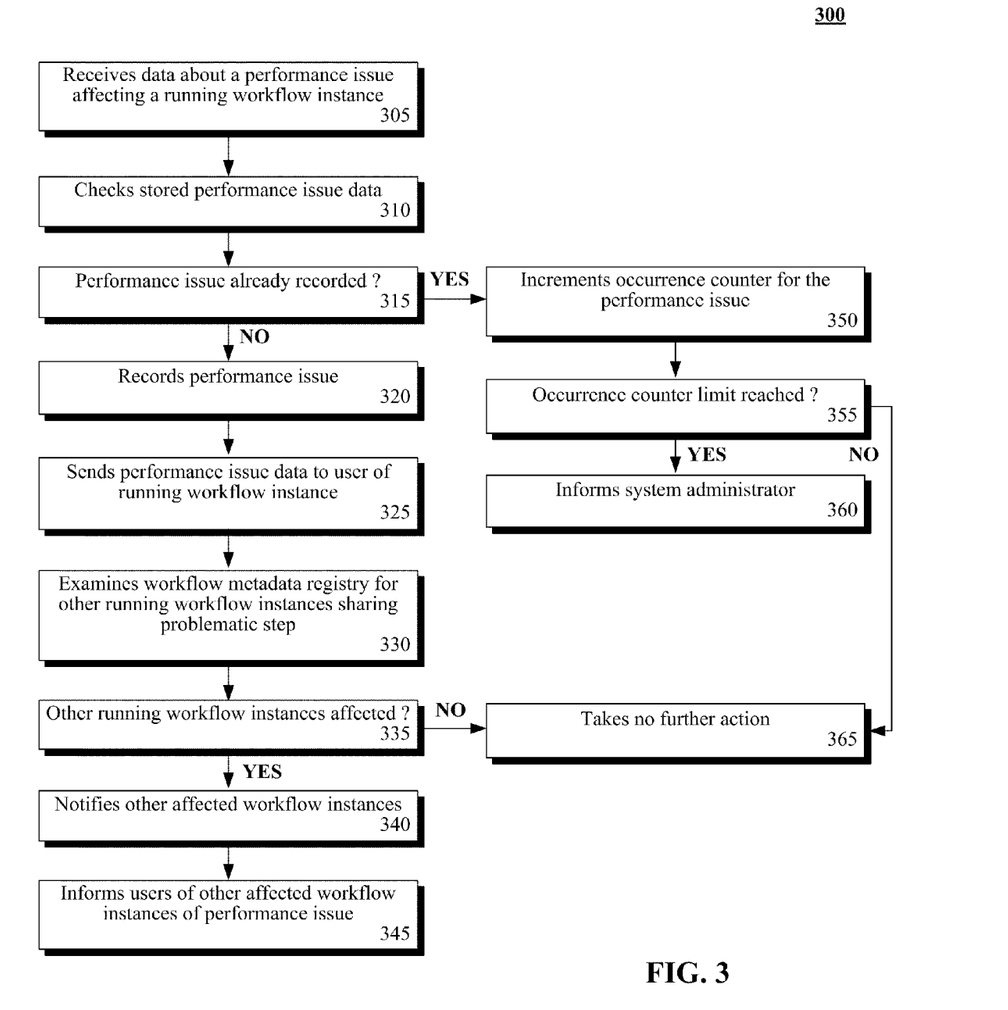
FIG. 3 is a flow chart of a method describing the handling of performance issue data by the workflow awareness controller in accordance with an embodiment of the inventive arrangements disclosed herein.

FIG. 3 is a flow chart of a method 300 describing the handling of performance issue data by the workflow awareness controller in accordance with embodiments of the inventive arrangements disclosed herein. Method 300 can be performed within the context of system 100 and/or in conjunction with method 200.

Method 300 can begin in step 305 where the workflow awareness controller can receive information regarding a performance issue affecting a running workflow instance. The performance issue data can be checked in step 310. In step 315, it can be determined if the performance issue has already been recorded.

When the performance issue has not been recorded, step 320 can be performed where the performance issue is recorded in the performance issue data. The performance issue data can be sent to the user of the running workflow instance in step 325.

The workflow metadata registry can be examined for other running workflow instances that share the problematic workflow step in step 330. In step 335, it can be determined if other running workflow instances are affected by the performance issue.

When no other running workflow instances are affected, the workflow awareness controller can take no further action in step 365. When other running workflow instances are affected, step 340 can be performed where the workflow awareness controller notifies the other affected workflow instances. The users of the other affected workflow instances can be informed of the performance issue in step 345.

Should the performance issue data already contain the performance issue, flow of method 300 can proceed from step 315 to step 350 where the workflow awareness controller can increment an occurrence counter for the performance issue. The occurrence counter can be a data field maintained within the performance issue data.

In step 355, it can be determined if the limit for the occurrence counter has been reached. The value for the occurrence counter limit can be a user-configurable operating parameter defined in the control settings for the workflow awareness controller.

When the limit for the occurrence counter has not been reached, no further action can be taken by the workflow awareness controller in step 365. When the limit for the occurrence counter has been met, step 360 can be performed where the workflow awareness controller can inform the system administrator of the performance issue.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for enabling workflow awareness within a business process management (BPM) system comprising:
    receiving of an instantiation request for a workflow by a workflow awareness controller, wherein said workflow comprises a plurality of workflow steps to be performed by a BPM system comprising hardware and software;
    determining, from a plurality of workflow metadata, at least one workflow redundancy with at least one workflow instance initiated prior to the receipt of the instantiation request, wherein the at least one workflow redundancy is categorized as one of an instance-level redundancy and a step-level redundancy, and, wherein the plurality of workflow metadata comprises at least one record that uniquely represents operating parameter values for a performance of the at least one prior workflow instance, wherein the determining comprises:
        querying a workflow metadata registry housing the plurality of workflow metadata for at least one record that matches at least one of a workflow identifier and a step identifier associated with the requested workflow, wherein the workflow identifier and step identifier uniquely designate a workflow and a workflow step, respectively;
        when at least one match exists matching the workflow identifier of the requested workflow, for each workflow step, comparing input values of the workflow step of the requested workflow with input values of the workflow step of the at least one match; and
        when the input values are identical, identifying the requested workflow as being an instance-level redundancy of the matching prior workflow instance; and
    when at least one workflow redundancy exists, utilizing persistent workflow data corresponding to the at least one workflow redundancy during the performance of a workflow instance of the requested workflow within the BPM system, wherein the persistent workflow data replaces running of at least one workflow step of the workflow instance, whereby reducing a redundant performance of the at least one workflow step for the requested workflow.

2. The method of claim 1, further comprising:
    when at least one match exists matching the step identifier of at least one workflow step of the requested workflow and the instance-level redundancy is non-existent for the requested workflow, for each match, comparing input values of the workflow step of the requested workflow with the input values of the at least one match matching the step identifier of the workflow step being compared;
    when the input values are identical, identifying the requested workflow as having a step-level redundancy with the matching workflow step; and
    capturing data for the matching workflow step in a redundancy list associated with the requested workflow, wherein the redundancy list is deleted upon at least one of completion of the requested workflow and exhaustion of the redundancy list.

3. The method of claim 2, further comprising:
    capturing workflow metadata for the requested workflow within the workflow metadata registry; and
    optionally, setting a user-configured expiration period for the captured workflow metadata, wherein said user-configured expiration period is defined within control settings for the workflow awareness controller.

4. The method of claim 1, further comprising:
    examining control settings for the workflow awareness controller for at least one user-defined relationship between the requested workflow and a second workflow, wherein the at least one user-defined relationship defines an equivalency between at least one of the workflow identifier and the step identifier of the requested workflow and a respective identifier of the second workflow; and
    requerying the workflow metadata registry for at least one record that matches the equivalency of the at least one user-defined relationship.

5. The method of claim 1, wherein, when the requested workflow is determined to be an instance-level redundancy, the utilization step further comprises:
    retrieving a final output value from the persistent workflow data for the prior workflow instance, wherein the final output value corresponds to an outcome generated by a complete performance of the prior workflow instance; and conveying the retrieved final output value to an originator of the instantiation request, wherein performance of an instance of the requested workflow within the BPM system is circumvented.

6. The method of claim 1, wherein, when the requested workflow is determined to have at least one step-level redundancy, the utilization step further comprises:
passing the instantiation request for the requested workflow to a BPM engine of the BPM system, wherein the BPM engine instantiates an instance of the requested workflow;
monitoring a performance of the requested workflow instance by the workflow awareness controller;
when performance of the requested workflow instance reaches the workflow step in the redundancy list, interrupting the performance of the requested workflow instance, wherein the workflow step is prevented from being performed by the BPM engine;
providing the BPM engine with at least one output value for the workflow step from the redundancy list; and
reinitiating performance of the requested workflow instance by the BPM engine, wherein the BPM engine recognizes the provided at least one output value as having satisfied performance of the workflow step.

7. The method of claim 6, further comprising:
while monitoring the performance of the requested workflow instance, receiving data regarding a performance issue from the BPM engine, wherein said performance issue negatively affects operation of the BPM system;
capturing the received performance issue data in a listing of stored performance issue data;
determining from the workflow metadata registry if the performance issue affects workflow instances that are currently running in the BPM system; and
when workflow instances are affected, notifying the affected workflow instances of the performance issue.

8. The method of claim 7, capturing of the received performance issue data further comprises:
examining the stored performance issue data for a previous recording of the received performance issue;
when the received performance issue already exists within the stored performance issue data, incrementing a value of an occurrence counter associated with the previous recording of the performance issue;
comparing the value of the occurrence counter to a predefined threshold value; and
when the predefined threshold value is exceeded, notifying a human agent of the BPM system.

9. The method of claim 1, wherein the plurality of workflow metadata comprises at least three of a unique workflow identifier, a unique step identifier for each step of the workflow, values for input parameters for each step of the workflow, textual identifiers for input parameters for each step of the workflow, textual identifiers for output parameters for each step of the workflow, a listing of output parameters for each step of the workflow to store as persisted workflow data, and an expiration period for workflow metadata records for the workflow.

10. A business process management (BPM) system that enables workflow awareness comprising:
one or more processors, one or more computer-readable memories and one or more computer-readable, tangible storage devices;
program instructions, stored on at least one of the one or more storage devices for execution by at least one of the one or more processors via at least one of the one or more memories, to receive of an instantiation request for a workflow by a workflow awareness controller, wherein said workflow comprises a plurality of workflow steps to be performed by a BPM system;
program instructions, stored on at least one of the one or more storage devices for execution by at least one of the one or more processors via at least one of the one or more memories, to determine, from a plurality of workflow metadata, at least one workflow redundancy with at least one workflow instance initiated prior to the receipt of the instantiation request, wherein the at least one workflow redundancy is categorized as one of an instance-level redundancy and a step-level redundancy, and, wherein the plurality of workflow metadata comprises at least one record that uniquely represents operating parameter values for a performance of the at least one prior workflow instance, wherein the determining comprises:
querying a workflow metadata registry housing the plurality of workflow metadata for at least one record that matches at least one of a workflow identifier and a step identifier associated with the requested workflow, wherein the workflow identifier and step identifier uniquely designate a workflow and a workflow step, respectively;
when at least one match exists matching the workflow identifier of the requested workflow, for each workflow step, comparing input values of the workflow step of the requested workflow with input values of the workflow step of the at least one match; and
when the input values are identical, identifying the requested workflow as being an instance-level redundancy of the matching prior workflow instance; and
program instructions, stored on at least one of the one or more storage devices for execution by at least one of the one or more processors via at least one of the one or more memories, to, when at least one workflow redundancy exists, utilize persistent workflow data corresponding to the at least one workflow redundancy during the performance of a workflow instance of the requested workflow within the BPM system, wherein the persistent workflow data replaces running of at least one workflow step of the workflow instance, whereby reducing a redundant performance of the at least one workflow step for the requested workflow.

11. The BPM system of claim 10, further comprising:
a workflow optimization interface configured to allow user-definition of equivalencies between workflow steps of at least two distinct workflows within a development environment.

12. The BPM system of claim 10, wherein the plurality of workflow metadata comprises at least three of a unique workflow identifier, a unique step identifier for each step of the workflow, values for input parameters for each step of the workflow, textual identifiers for input parameters for each step of the workflow, textual identifiers for output parameters for each step of the workflow, a listing of output parameters for each step of the workflow to store as persisted workflow data, and an expiration period for workflow metadata records for the workflow.

13. A computer program product comprising a non-transitory computer readable storage medium having computer usable program code embodied therewith, the computer usable program code comprising:
computer usable program code configured to receive an instantiation request for a workflow, wherein said workflow comprises a plurality of workflow steps to be performed by a BPM system;

computer usable program code configured to determine, from a plurality of workflow metadata, at least one workflow redundancy with at least one workflow instance initiated prior to the receipt of the instantiation request, wherein the at least one workflow redundancy is categorized as one of an instance-level redundancy and a step-level redundancy, and, wherein the plurality of workflow metadata comprises at least one record that uniquely represents operating parameter values for a performance of the at least one prior workflow instance, wherein the computer usable program code to determine comprises:

computer usable program code configured to query a workflow metadata registry housing the plurality of workflow metadata for at least one record that matches at least one of a workflow identifier and a step identifier associated with the requested workflow, wherein the workflow identifier and step identifier uniquely designate a workflow and a workflow step, respectively;

computer usable program code configured to, when at least one match exists matching the workflow identifier of the requested workflow, for each workflow step, compare input values of the workflow step of the requested workflow with input values of the workflow step of the at least one match; and computer usable program code configured to, when the input values are identical, identify the requested workflow as being an instance-level redundancy of the matching prior workflow instance; and computer usable program code configured to, when at least one workflow redundancy exists, utilize persistent workflow data corresponding to the at least one workflow redundancy during the performance of a workflow instance of the requested workflow within the BPM system, wherein the persistent workflow data replaces performance of at least one workflow step of the workflow instance, whereby reducing a redundant performance of the at least one workflow step for the requested workflow.

14. The computer program product of claim 13, further comprising:

computer usable program code configured to, when at least one match exists matching the step identifier of at least one workflow step of the requested workflow and the instance-level redundancy is non-existent for the requested workflow, for each match, compare input values of the workflow step of the requested workflow with the input values of the at least one match matching the step identifier of the workflow step being compared;

computer usable program code configured to, when the input values are identical, identify the requested workflow as having a step-level redundancy with the matching workflow step; and computer usable program code configured to capture data for the matching workflow step in a redundancy list associated with the requested workflow, wherein the redundancy list is deleted upon at least one of completion of the requested workflow and exhaustion of the redundancy list.

15. The computer program product of claim 13, further comprising:

computer usable program code configured to capture workflow metadata for the requested workflow within the workflow metadata registry; and computer usable program code configured to, optionally, set a user-configured expiration period for the captured workflow metadata.

16. The computer program product of claim 13, further comprising:

computer usable program code configured to examine a plurality of control settings for at least one user-defined relationship between the requested workflow and a second workflow, wherein the at least one user-defined relationship defines an equivalency between at least one of the workflow identifier and the step identifier of the requested workflow and a respective identifier of the second workflow; and computer usable program code configured to requery the workflow metadata registry for at least one record that matches the equivalency of the at least one user-defined relationship.

17. The computer program product of claim 13, wherein, when the requested workflow is determined to be an instance-level redundancy, the utilization step further comprises:

computer usable program code configured to retrieve a final output value from the persistent workflow data for the prior workflow instance, wherein the final output value corresponds to an outcome generated by a complete performance of the prior workflow instance; and computer usable program code configured to convey the retrieved final output value to an originator of the instantiation request, wherein performance of an instance of the requested workflow within the BPM system is circumvented.

18. The computer program product of claim 13, wherein, when the requested workflow is determined to have at least one step-level redundancy, the utilization step further comprises:

computer usable program code configured to pass the instantiation request for the requested workflow to a BPM engine of the BPM system, wherein the BPM engine instantiates an instance of the requested workflow;

computer usable program code configured to monitor a performance of the requested workflow instance;

computer usable program code configured to, when performance of the requested workflow instance reaches the workflow step in the redundancy list, interrupt the performance of the requested workflow instance, wherein the workflow step is prevented from being performed by the BPM engine;

computer usable program code configured to provide the BPM engine with at least one output value for the workflow step from the redundancy list; and computer usable program code configured to reinitiate performance of the requested workflow instance by the BPM engine, wherein the BPM engine recognizes the provided at least one output value as having satisfied performance of the workflow step.

* * * * *